(12) United States Patent
Lehmann et al.

(10) Patent No.: US 6,371,060 B1
(45) Date of Patent: Apr. 16, 2002

(54) CONTROL DEVICE FOR THE COOLING AND HEATING CIRCUIT OF AN INTERNAL COMBUSTION ENGINE

(75) Inventors: Kai Lehmann, Ludwigsfelde; Götz Von Esebeck, Mahlow, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/612,967

(22) Filed: Jul. 10, 2000

(30) Foreign Application Priority Data

Jul. 10, 1999 (DE) .......................................... 199 21 313

(51) Int. Cl.$^7$ .................................................. F01P 7/14
(52) U.S. Cl. ...................................................... 123/41.1
(58) Field of Search ........................................ 123/41.1

(56) References Cited

U.S. PATENT DOCUMENTS

| 3,124,162 A | 3/1964 | Cameron ............... 137/625.11 |
| 4,644,909 A | 2/1987 | Nishikata et al. .......... 123/41.1 |
| 5,110,045 A | 5/1992 | Glasson et al. ............ 236/93 R |
| 5,529,026 A * | 6/1996 | Kurr et al. .................. 123/41.1 |
| 5,617,815 A | 4/1997 | Spies et al. ................ 123/41.1 |

FOREIGN PATENT DOCUMENTS

| DE | 86 22 665 | 3/1987 |
| DE | 43 24 749 | 1/1995 |
| DE | 44 16 039 | 8/1995 |
| DE | 196 32 533 | 10/1997 |
| DE | 198 09 124 | 6/1999 |
| GB | 1 399 244 | 6/1975 |
| JP | 10-77837 | 3/1998 |

* cited by examiner

*Primary Examiner*—Tony M. Argenbright
*Assistant Examiner*—Katrina B. Harris
(74) *Attorney, Agent, or Firm*—Crowell & Moring LLP

(57) ABSTRACT

A control device for a cooling part-circuit and a heating part-circuit of an internal combustion engine. The cooling part-circuit includes a radiator and the heating part-circuit includes a heat exchanger. A delivery pump is connected to at least the cooling part-circuit and the heating part-circuit. The control device includes a rotary slide driven by a drive unit which is arranged in a valve housing. Provided in the valve housing are inlet or outlet openings for 1.) a cooling part-circuit which is connected to the radiator, 2.) a suction or pressure side of the delivery pump and 3.) at least two further part-circuits. The rotary slide is constructed as a substantially flat rotary disc with at least one control edge.

36 Claims, 4 Drawing Sheets

CONTROL DEVICE FOR THE COOLING AND HEATING CIRCUIT OF AN INTERNAL COMBUSTION ENGINE

BACKGROUND AND SUMMARY OF THE INVENTION

This application claims the priority of German patent document 199 21 313.5, filed Jul. 10, 1999, the disclosure of which is expressly incorporated by reference herein.

The invention relates to a control device for the cooling and heating circuit of an internal combustion engine.

In order to control the cooling and heating circuit of an internal combustion engine, thermostats are known from practice which, as a function of temperature, connect a bypass circuit in the warm-up phase of the internal combustion engine. In addition, intermittently operated valves are known which, in the heating circuit, connect the cooling-medium flows in accordance with predefined requirements.

U.S. Pat. No. 4,644,909 discloses a cooling system for an internal combustion engine in which the control of the cooling medium flow is carried out by a valve having a rotary slide. The valve, having a radial inlet opening and a radial and an axial outlet opening, has a sleeve-like rotary slide which is driven by a stepping motor.

German patent document No. 44 16 039 describes a regulating valve which has a valve element constructed as a rotary slide. This very complicated shaped valve element is able to connect a number of inlet and outlet openings located in one radial plane to one another. As a result, it is possible for mixed states between a number of the inlet and outlet openings to be achieved.

The drawback with these valves is that not all adjustment or mixed positions are possible, so that in order to achieve specific mixtures and specific circuit connections, a number of valves are needed. Furthermore, the aforementioned valves are very large in terms of their overall space and are restricted in terms of their installation position by the necessary, predefined position of the inlet and outlet lines.

In German patent document No. 198 09 124, which is not considered prior art, a description is given of a control device for the cooling and heating circuit of an internal combustion engine in which a rotary slide is arranged in a valve housing. This substantially sleeve-like rotary slide can connect an axial collecting opening, for the supply or discharge of cooling medium, to an individual inlet or outlet opening, or alternatively, during the performance of a mixing operation, can make an overlapping connection between two adjacently located inlet or outlet openings.

Here too, for the most comprehensive functioning possible, one is bound by the predefined position of the collecting opening and the inlet or outlet openings. However, if this disadvantage is accepted with regard to the rigidly predefined installation position of the connections, then the aforementioned control device is capable of implementing a number of part-circuits in all the conceivable variants of mixing, bypass or sole operation of one of the part-circuits.

The present invention is based on the object of providing a control device in which a number of functions of setting and connecting elements are integrated in such a way that, if required, further regulating elements in a cooling and heating circuit of a motor vehicle can be dispensed with, and which moreover permits a large variability in the configuration of the position of the external connecting elements.

Using the control device according to the present invention, the entire circuit for cooling and for heating for virtually all the situations which arise in practice can be regulated with a single appliance. Both individual openings can be selected, and mixing operations are also possible, so that it is possible to dispense with further control and regulating elements in the cooling and heating circuit of the internal combustion engine.

By means of a preferred embodiment of the present invention, in addition to the individual flows, all the mixing stages which occur in practice can also be implemented. In addition, in the case of the control device according to the present invention, only low pressure losses occur, and high setting speeds may be implemented at the same time.

As a result of the simple and effective construction, in addition to low pressure losses, inexpensive mass production or high-volume production of the control devices according to the invention is also made possible.

In a further preferred embodiment of the present invention, the control device, or at least parts of the control device, are constructed as an integrated recess in a component of the internal combustion engine or of one of its additional units.

This means that, for example, the lower housing part with its associated connections can be integrated directly into the crankcase of the internal combustion engine or into a component of the delivery pump. As a result of the arbitrary position and outgoing route of the connecting stubs, and as a result of the use of feed channels integrated into the upper housing part and/or the lower housing part for the cooling medium, this form can be cast very simply into the crankcase or the like during the production of the latter. This valve housing, integrated or at least semi-integrated in this way, permits further advantages with regard to the overall space and the usual and required sealing of connecting lines to the connecting stubs, since these seals can be dispensed with entirely or at least in the integrated part of the valve housing.

Further advantages result with regard to the overall space requirements, the mounting options, the required mounting time, and the required outlay for mounting during the production of a motor vehicle with the control device according to the present invention.

Other objects, advantages and novel features of the present invention will become apparent from the following detailed description of the invention when considered in conjunction with the accompanying drawings.

BRIEF DESCRIPTION OF THE DRAWINGS

Further advantageous refinements and developments of the invention emerge from the dependent claims and the exemplary embodiments illustrated in principle using the following drawings, in which:

DETAILED DESCRIPTION OF THE DRAWINGS

Figure 1:
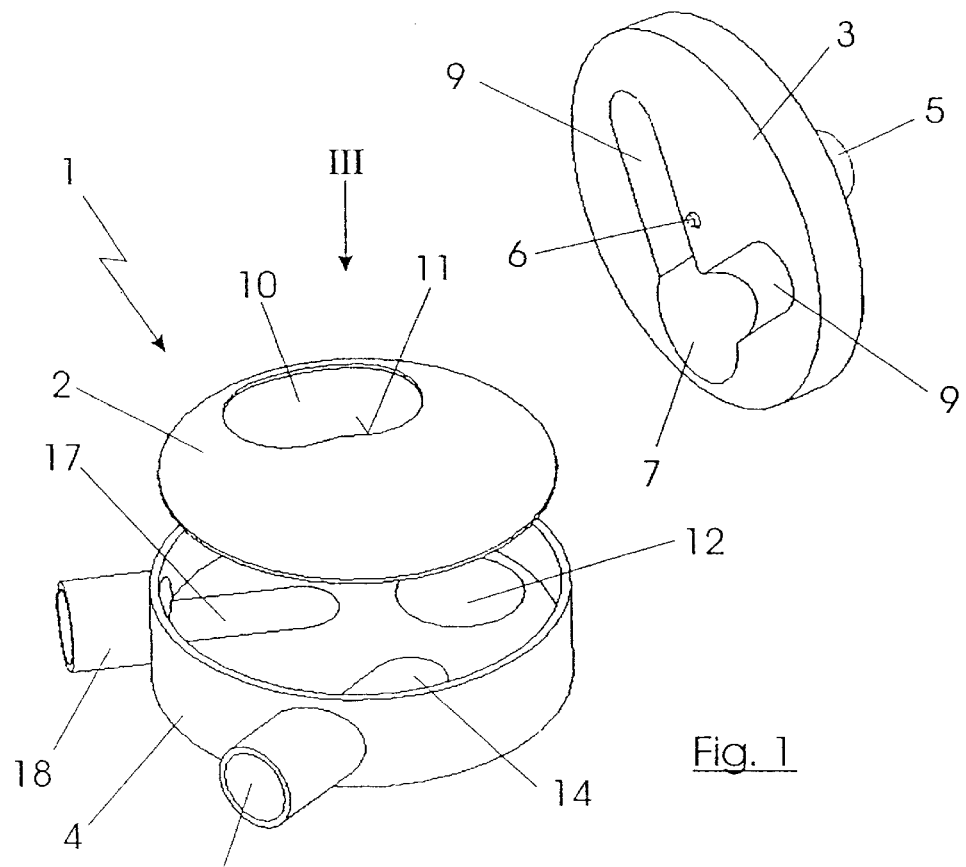
FIG. 1 shows a perspective illustration of the control device including a rotary disc according to the invention.

FIG. 1 shows one embodiment of the control device 1 in a perspective basic illustration. A rotary disc 2, an upper housing part 3 and a lower housing part 4 being principally illustrated.

In order to see the construction and functioning of the control device 1 more clearly, in FIG. 1, the individual parts are illustrated disassembled, the upper housing part 3 being tilted to the side.

On the side of the upper housing part 3 facing away from the rotary disc 2, it is possible to see a drive unit 5, which when the control device 1 is assembled, drives the rotary disc 2 via a drive shaft 6. Here, for reasons of clarity, the illustration of a matching element to the drive shaft 6 on the rotary disc 2 has been omitted.

The upper housing part 3 has an opening 7 through which a feed or discharge of cooling medium to the suction or pressure side of a delivery pump 8 (illustrated in FIG. 7 and FIG. 8) takes place. In addition, two channels 9, which are arranged on the side of the upper housing part 3 facing the rotary disc 2, open into the opening 7. The task of the channels 9 is to route the cooling medium, for example, entering the control device 1 through the opening 7, in accordance with the requirements of the control to be carried out.

The cooling medium entering, for example, through the opening 7 and the channels 9, is kept away from the lower housing part 4 by the rotary disc 2. The cooling medium passes to the lower housing part 4 only through an axial aperture 10, which is surrounded by a control edge 11 and has an approximately kidney-like shape.

Figure 7:
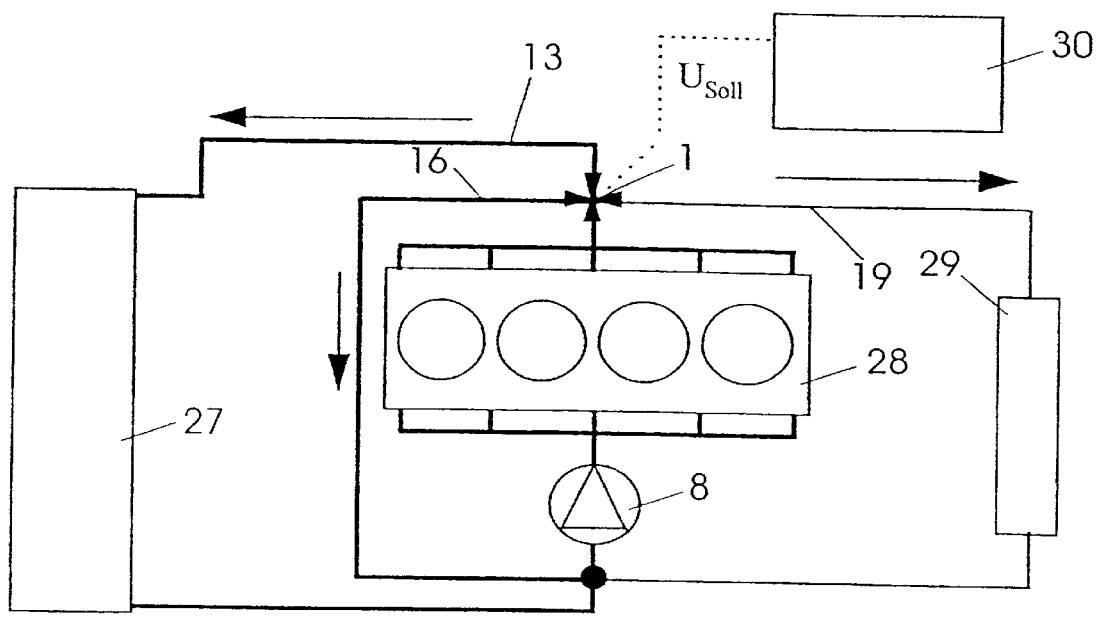
FIG. 7 shows an embodiment of the control device arranged in a cooling and heating circuit according to the invention.
Figure 8:
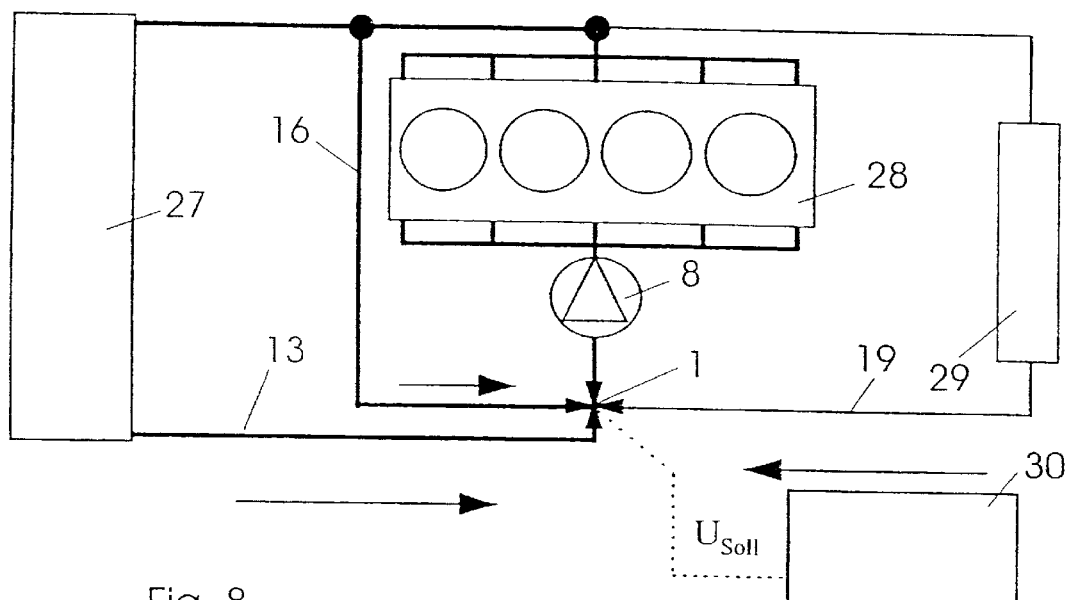
FIG. 8 shows an alternative embodiment of the control device arranged in the cooling and heating circuit according to the invention.

The lower housing part 4 has an opening 12 which is connected to a cooling line 13 which can be seen in FIG. 7 and FIG. 8. In addition, the lower housing part 4 has a channel 14 which opens into a connecting stub 15 for a bypass circuit 16 which can be seen in FIG. 7 and FIG. 8. A further channel 17 in the lower housing part 4 opens into a connecting stub 18 which is connected to a heating line 19 which can be seen in FIG. 7 and FIG. 8.

Figure 2:
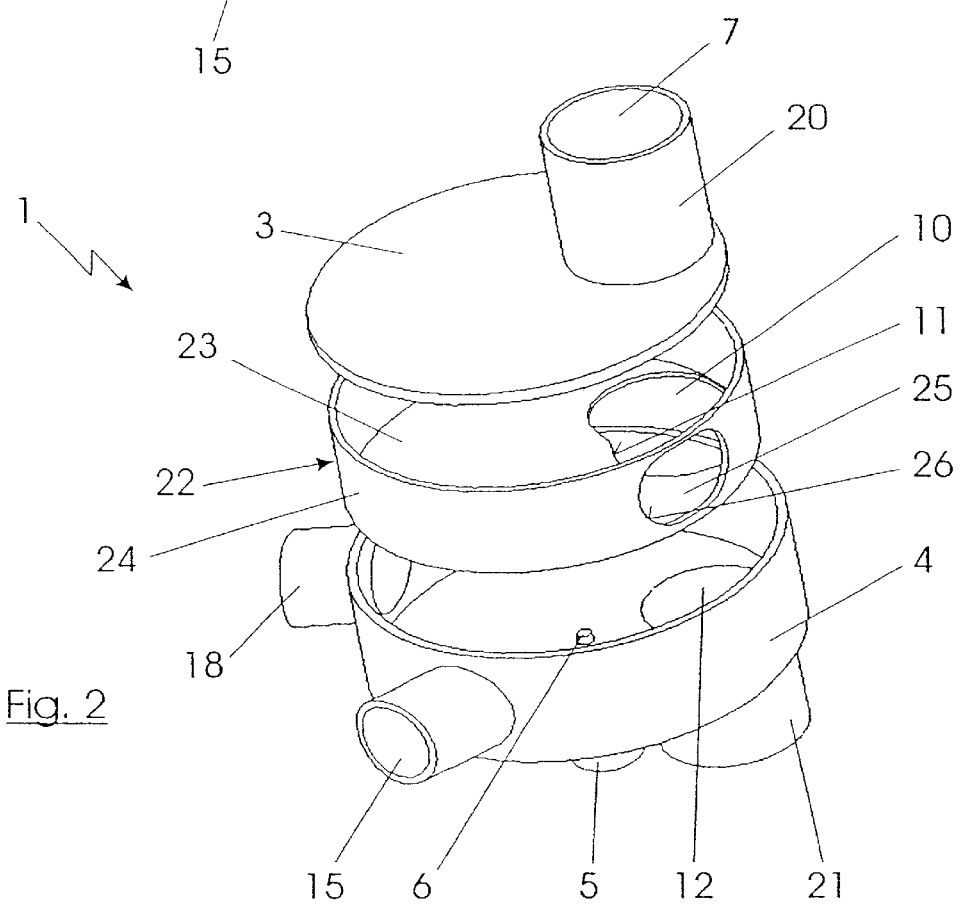
FIG. 2 shows a perspective illustration of the control device including a rotary element according to the invention.

FIG. 2 reveals the three-dimensional illustration of a control device 1 which is based on the same concepts but has some design differences. The drive unit 5 in this embodiment is fitted to the lower housing part 4. Among other reasons, this is made possible by the off-center arrangement of the connecting stub 20 opening into the opening 7 and the connecting stub 21 opening into the opening 12. As a result of the use of a rotary element 22, which is composed of a disc-like part-element 23 and a sleeve-like part-element 24, the channels 9, 14, 17 that can be seen in FIG. 1 can be omitted in this embodiment. The disc-like part-element 23 has an axial aperture 10 with a control edge 11, in a similar way to the rotary disc 2 from FIG. 1. Instead of the channels 14, 17, in this embodiment there is a radial aperture 25 with the control edge 26 enclosing it.

Depending on the embodiment of the control device 1, it may be expedient to arrange a number of radial apertures 25 over the periphery of the sleeve-like part-element 24.

FIG. 3 to FIG. 6 reveal schematic illustrations of a number of control options according to the view III of the embodiment of the control device 1 illustrated in FIG. 1.

In the device of the present invention, the cooling medium, as can be seen in FIG. 1, flows through the opening 7 into the interior of the control device and is distributed via the channels 9 in such a way that the axial aperture 10 can be reached in any desired position of the rotary disc 2 by the cooling medium entering through the opening 7. Depending on the position of the rotary disc 2, the cooling medium is then discharged in accordance with the control positions illustrated in FIG. 3 to FIG. 6.

Figure 3:
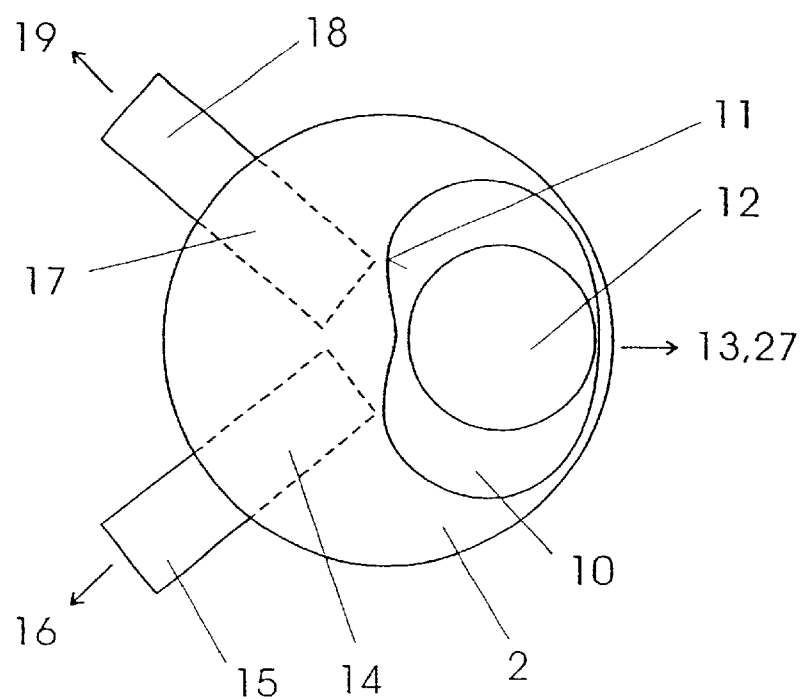
FIGS. 3–6 show various control positions of the rotary disc in a basic illustration according to the view III in FIG. 1.

FIG. 3 shows the control position referred to as the "radiator connected through" position, in which only the circuit comprising the cooling line 13, a radiator 27 and an internal combustion engine 28 (which can be seen in FIG. 7 and FIG. 8) is supplied by the delivery pump 8.

Figure 4:
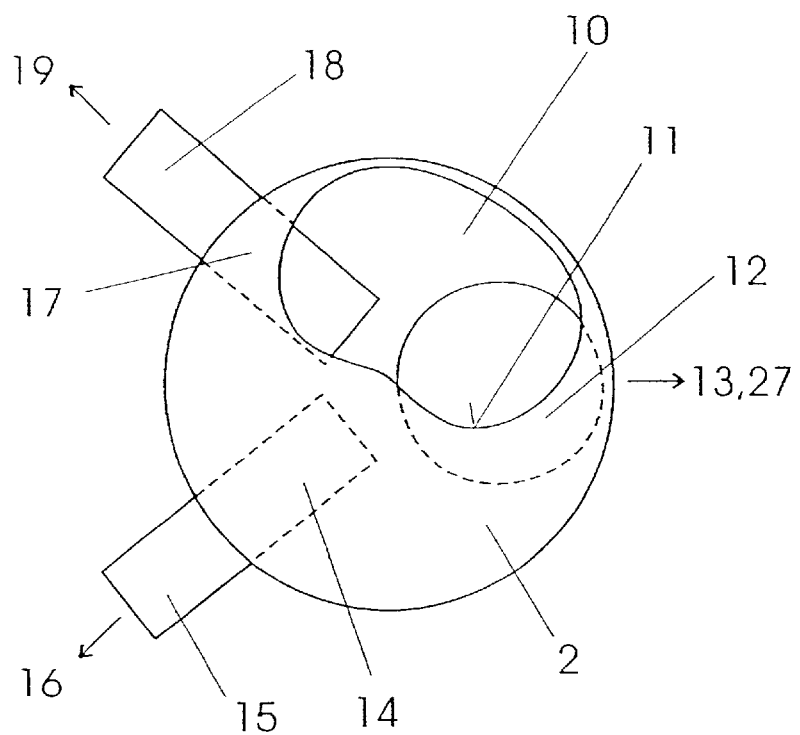

FIG. 4 illustrates the control position referred to as the "mixing stage radiator-heating" position. In this position, the delivery pump 8 supplies both the above-described cooling circuit and a heating circuit, including the heating line 19 and a heat exchanger 29, at the same time in a mixing operation. In this arrangement, a further variation in the angular position of the rotary disc 2 permits different types of flow rates through both the cooling circuit and the heating circuit to be achieved.

Figure 5:
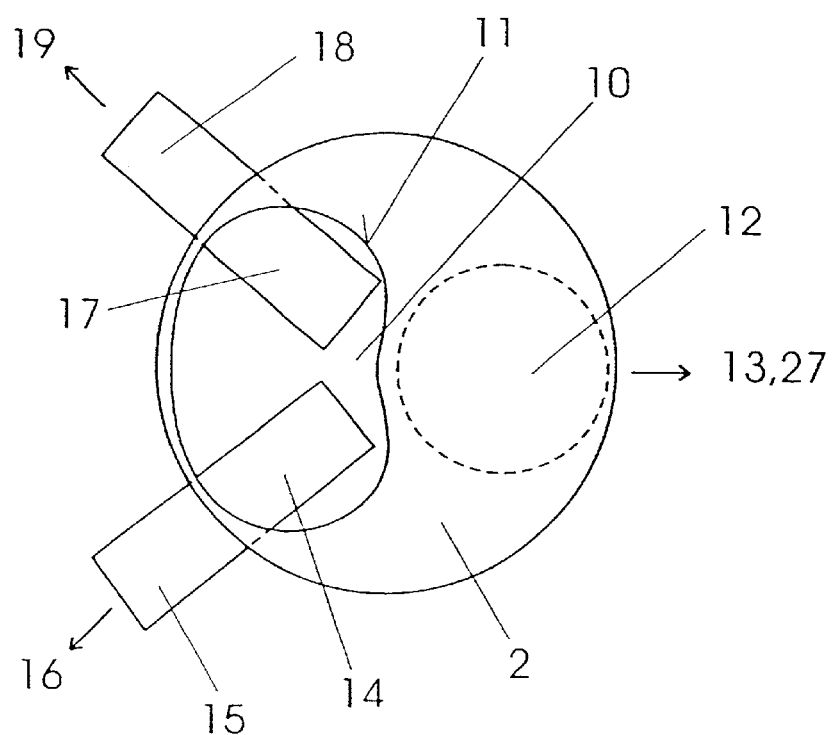

FIG. 5 reveals the control position referred to as the "mixing stage bypass/heating" position. In this position, for example, when the internal combustion engine is being warmed up and when there is a simultaneous heating operation, the bypass circuit 16 and the heating circuit 19, 29 are operated at the same time.

Figure 6:
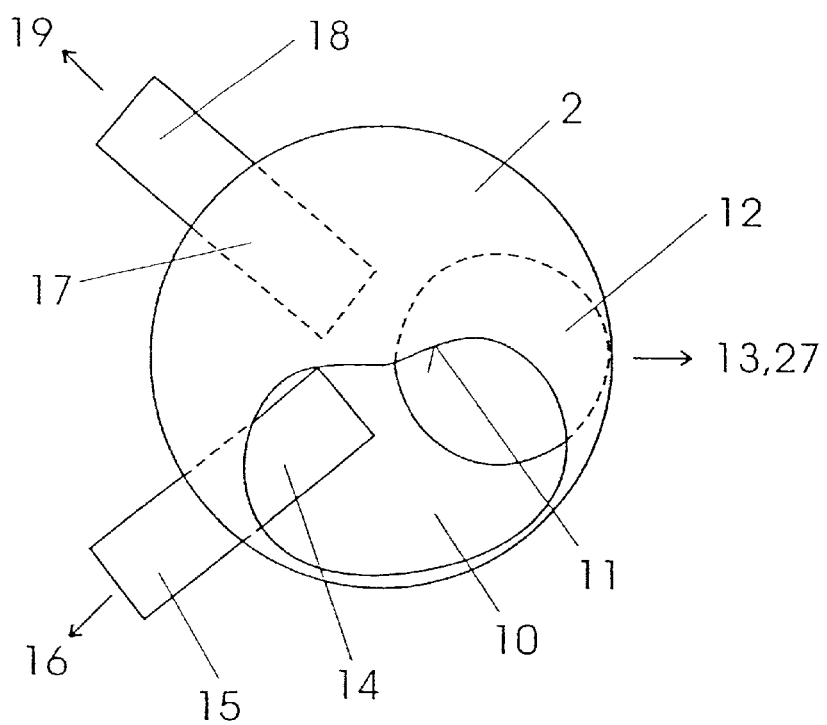

FIG. 6 reveals a further possible control position, specifically referred to as the "mixing stage bypass/radiator" position. In this position, the bypass circuit 16 and the radiator circuit, comprising the cooling line 13 and radiator 27, are operated at the same time.

FIG. 7 and FIG. 8 illustrate two possible arrangements for the control device 1 in the appropriate circuits. By means of the control electronics 30, the drive unit 5 of the control device 1 is controlled or regulated in accordance with the requirements via a predefined reference voltage $U_{soll}$. The control devices 1 feed cooling-medium from the delivery pump 8 through the opening 7 and the outlet openings 12, 15, 18 into the cooling and heating circuits of the internal combustion engine 28, and can be designed both in accordance with FIG. 1 and in accordance with FIG. 2.

The arrows that can be seen in FIG. 7 beside the bypass circuit 16, beside the cooling line 13 (which leads to the radiator 27 and from there back to the delivery pump 8 again) and beside the heating line 19 (in which the heat exchanger 29 is arranged and from which a return line leads to the delivery pump 8), show the respective flow directions of the cooling medium. The drive device 5 for the rotary disc 2 or for the rotary element 22 is driven via the control electronics 30 (not specifically illustrated), using the reference voltage $U_{soll}$.

In the position of the control device 1 illustrated in FIG. 7, the rotary disc 2 or the rotary element 22 distributes the individual part-volume flows in accordance with its control position.

According to the position of the control device 1 illustrated in FIG. 8, the rotary disc 2 or the rotary element 22 combines the individual part-volume flow in accordance with the control position. The opening 7 in this arrangement is connected on the suction side or the inlet side of the delivery pump 8. The arrows beside the lines 13, 16, 19 again show the respective flow direction of the cooling medium, in this case the openings 12, 15, 18 in the control device 1 constituting inlet openings rather than outlet openings. The opening 7 therefore serves to feed the cooling medium to the suction side of the delivery pump 8. The mode of operation of the control device 1 also corresponds, in the case of the position of the control device 1 illustrated in FIG. 8, to the mode of operation according to the position shown in FIG. 7.

In either of the circuit arrangements, shown in FIG. 7 and in FIG. 8, each of the embodiments of the control device, namely those shown according to FIG. 1 and to FIG. 2, can be implemented.

All the exemplary embodiments illustrated are only illustrations of the principle of the present invention. As a result, the position of the connecting stubs 15, 18, 20, 21 can be varied. For example, all of the connecting stubs can be designed to have an axial attachment, a radial attachment or a semiaxial attachment. Of course, it is conceivable that some of the connecting stubs can be arranged axially, while others can be attached radially and others semiaxially in a particular embodiment. According to this disclosure, semiaxially means that the axes of the connecting stubs are arranged at an angle different from 0° or 90° to the axis of rotation of the rotary disc 2 or of the rotary element 22.

In an embodiment which is not illustrated, the control device 1, or at least parts of the control device 1, for example, the upper housing part 3 and/or the lower housing part 4, can be integrated into a component of the internal combustion engine 28. For instance, the upper housing part 3 could be formed in one piece together with the crankcase of the internal combustion engine 28 during the production of the crankcase.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Control device for a cooling and heating circuit of an internal combustion engine having a radiator, having a delivery pump and having a further part-circuit comprising a heat exchanger for the heating circuit, with the following features:
   a rotary slide driven by a drive unit is arranged in a valve housing,
   provided in the valve housing are inlet or outlet openings for a cooling line connected to the radiator, for a feed or discharge of cooling medium to the suction or pressure side of the delivery pump and for at least two further part-circuits,
   the rotary slide comprising a substantially flat rotary disc having a thickness substantially smaller than a diameter thereof and at least one control edge, and
   the control edge is formed in such a way that a connection is made from an opening for the feed or discharge of cooling medium to the suction or pressure side of the delivery pump, to an individual inlet or outlet opening or, for mixing operation, an overlapping connection to two adjacently located inlet or outlet openings.

2. Control device according to claim 1, wherein the valve housing has an upper part and a lower part, at least one of the upper housing part and the lower housing part having channels, and the channels each having a connection to one of the inlet or outlet openings.

3. Control device according to claim 1, wherein the at least one control edge in the rotary disc is formed as a peripheral edge of an axial aperture through the rotary disc.

4. Control device according to claim 3, wherein the aperture has a kidney shape.

5. Control device according to claim 1, wherein connecting stubs branch off from the inlet or outlet openings, at least some of the connecting stubs being arranged radially with respect to the axis of rotation of the rotary slide.

6. Control device according to claim 5, wherein at least some of the connecting stubs are arranged axially with respect to the axis of rotation of the rotary slide.

7. Control device according to claim 5, wherein the at least one of the connecting stubs is arranged semiaxially with respect to the axis of rotation of the rotary slide.

8. Control device according to claim 5, wherein at least one of the upper housing part, the lower housing part and the connecting stubs are constructed as integrated recesses in a component of the internal combustion engine or one of its additional units.

9. Control device according to claim 5, wherein at least one of the upper housing part, the lower housing part and the connecting stubs is constructed as an integrated recess in a component of the delivery pump.

10. Control device according to claim 1, wherein the further part-circuits are provided for a bypass circuit line for a cooling water and for a heating line leading to the heat exchanger of the heating circuit.

11. Control device according to claim 10, wherein one or both further part-circuits are provided with at least one of an additional heater and an exhaust-gas heat-exchanger device.

12. Control device for the cooling and heating circuit of an internal combustion engine having a radiator, having a delivery pump and having a further part-circuit comprising a heat exchanger for the heating circuit, with the following features:
   a rotary slide driven by a drive unit is arranged in a valve housing,
   provided in the valve housing are inlet or outlet openings for a cooling line connected to the radiator, for a feed or discharge of cooling medium to the suction or pressure side of the delivery pump and for at least two further part-circuits,
   the rotary slide comprising a pot shaped rotary element formed from a substantially flat rotary disc part-element having a thickness substantially smaller than a diameter thereof and a cylindrical sleeve part-element, each of the part-elements having at least one control edge, and
   the control edges are formed in such a way that a connection is made from the opening for the feed or discharge of cooling medium to the suction or pressure side of the delivery pump, to an individual inlet or outlet opening or, for mixing operation, an overlapping connection to two adjacently located inlet or outlet openings.

13. Control device according to claim 12, wherein the at least one control edge in the cylindrical sleeve part-element is formed as a peripheral edge of a radial aperture through the cylindrical sleeve part-element.

14. A control device for a cooling part-circuit and a heating part-circuit of an internal combustion engine including a radiator in the cooling part-circuit, a heat exchanger in the heating part-circuit, and a delivery pump connected to at least the cooling part-circuit and the heating part-circuit, comprising:
   a valve housing;
   a rotary slide arranged in the valve housing and driven by a drive unit, the rotary slide including a flat rotary disc having a thickness substantially smaller than a diameter thereof with at least one control edge; and
   a plurality of inlet or outlet openings arranged in the valve housing for the cooling part-circuit, for a suction or a pressure side of the deliver pump and for at least two further part-circuits;
   wherein the at least one control edge of the rotary slide is formed such that a selective connection is capable of being made upon rotation of the rotary slide by the drive unit, between the opening in the valve housing which is connected to the suction or the pressure side of the delivery pump, and an individual inlet or outlet opening in the valve housing, or to two adjacently located inlet or outlet openings in the valve housing for performing a mixing operation.

15. The control device of claim 14, wherein the valve housing includes an upper housing part and a lower housing part, at least one of the upper housing part and the lower housing part having channels, each channel having a connection to one of the plurality of inlet or outlet openings arranged in the valve housing.

16. The control device of claim 14, wherein the at least one control edge of the rotary slide is a peripheral edge of an aperture extending axially through the rotary disc.

17. The control device of claim 16, wherein the aperture device has a kidney shape.

18. The control device of claim 14, wherein connecting stubs extend from the plurality of inlet or outlet openings in the valve housing and at least one of the connecting stubs is arranged to extend radially with respect to an axis of rotation of the rotary slide.

19. The control device of claim 18, wherein at least one of the connecting stubs is arranged to extend substantially axially with respect to the axis of rotation of the rotary slide.

20. The control device of claim 19, wherein at least one of the connecting stubs is arranged semiaxially with respect to the axis of rotation of the rotary slide.

21. The control device of claim 18, wherein at least one of the upper housing part, the lower housing part and the connecting stubs are constructed as an integral component of the internal combustion engine.

22. The control device of claim 18, wherein at least one of the upper housing part, the lower housing part and the connecting stubs are constructed as an integral component of the delivery pump.

23. The control device of claim 14, further including a bypass part-circuit connected to the control device.

24. A control device for a cooling part-circuit and a heating part-circuit of an internal combustion engine including a radiator in the cooling part-circuit, a heat exchanger in the heating part-circuit, and a delivery pump connected to at least the cooling part-circuit and the heating part-circuit, comprising:

a valve housing;

a rotary slide arranged in the valve housing and driven by a drive unit, the rotary slide including a substantially flat rotary disc part-element having a thickness substantially smaller than a diameter thereof and a cylindrical sleeve part-element forming a pot shaped rotary element, each of the substantially flat rotary disc part-element and the cylindrical sleeve part-element having at least one control edge; and a plurality of inlet or outlet openings arranged in the valve housing for the cooling part-circuit, for a suction or a pressure side of the deliver pump and for at least two further part-circuits;

wherein the control edges of the rotary slide are formed such that a selective connection is capable of being made upon rotation of the rotary slide by the drive unit, between the opening in the valve housing which is connected to the suction or the pressure side of the delivery pump, and an individual inlet or outlet opening in the valve housing, or to two adjacently located inlet or outlet openings in the valve housing for performing a mixing operation.

25. The control device of claim 24, wherein the valve housing includes an upper housing part and a lower housing part, at least one of the upper housing part and the lower housing part having channels, each channel having a connection to one of the plurality of inlet or outlet openings arranged in the valve housing.

26. The control device of claim 24, wherein the at least one control edge of the substantially flat rotary disc part-element of the rotary slide is a peripheral edge of an aperture extending axially through the substantially flat rotary disc part-element.

27. The control device of claim 26, wherein the aperture device has a kidney shape.

28. The control device of claim 24, wherein connecting stubs extend from the plurality of inlet or outlet openings in the valve housing and at least one of the connecting stubs is arranged to extend radially with respect to an axis of rotation of the rotary slide.

29. The control device of claim 28, wherein at least one of the connecting stubs is arranged to extend substantially axially with respect to the axis of rotation of the rotary slide.

30. The control device of claim 29, wherein at least one of the connecting stubs is arranged semiaxially with respect to the axis of rotation of the rotary slide.

31. The control device of claim 28, wherein at least one of the upper housing part, the lower housing part and the connecting stubs are constructed as an integral component of the internal combustion engine.

32. The control device of claim 28, wherein at least one of the upper housing part, the lower housing part and the connecting stubs are constructed as an integral component of the delivery pump.

33. The control device of claim 24, further including a bypass part-circuit connected to the control device.

34. A control device for a cooling part-circuit and a heating part-circuit of an internal combustion engine including a radiator in the cooling part-circuit, a heat exchanger in the heating part-circuit, and a delivery pump connected to at least the cooling part-circuit and the heating part-circuit, comprising:

a valve housing;

a rotary slide means having a thickness substantially smaller than a diameter thereof arranged in the valve housing and driven by a drive means; and a plurality of inlet o r outlet openings arranged in the valve housing for the cooling part-circuit, for a suction or a pressure side of the deliver pump and for at least two further part-circuits;

wherein the drive means is operable to rotate the rotary slide means for selectively connecting the opening in the valve housing which is connected to the suction or the pressure side of the delivery pump to either an individual inlet or outlet opening in the valve housing, or to two adjacently located inlet or outlet openings in the valve housing for performing a mixing operation.

35. The control device of claim 34, wherein the rotary slide means includes a flat rotary disc with at least one control edge.

36. The control device of claim 34, wherein the rotary slide means includes a substantially flat rotary disc part-element and a cylindrical sleeve part-element forming a pot shaped rotary element, each of the substantially flat rotary disc part-element and the cylindrical sleeve part-element having at least one control edge.

* * * * *